United States Patent [19]

LaFountain

[11] Patent Number: 4,993,259
[45] Date of Patent: Feb. 19, 1991

[54] METHOD AND APPARATUS FOR TESTING PREFILLED HYDRAULIC SYSTEMS

[75] Inventor: Robert H. LaFountain, Rochester, Mich. 48063

[73] Assignee: Automotive Products plc, Warwickshire, England

[21] Appl. No.: 331,755

[22] Filed: Apr. 3, 1989

[51] Int. Cl.⁵ .................................................. G01M 19/00
[52] U.S. Cl. ........................................................... 73/168
[58] Field of Search .................... 73/168, 37, 37.6, 40

[56] References Cited

U.S. PATENT DOCUMENTS

| | | | |
|---|---|---|---|
| 1,650,736 | 11/1927 | Zelov | 73/40 |
| 2,528,563 | 11/1950 | Testut et al. | 73/40 |
| 2,691,299 | 10/1954 | Ward | 73/40 |
| 3,090,221 | 5/1963 | Cosby | 73/40 |
| 3,098,382 | 7/1963 | Hoffman et al. | 73/168 |
| 3,144,766 | 8/1964 | Brown | 73/168 |
| 3,360,982 | 1/1968 | Mitchell et al. | 73/40 |
| 3,438,246 | 4/1969 | Lotti | 73/40 |
| 3,438,247 | 4/1969 | Lotti et al. | 73/40 |
| 3,727,456 | 4/1973 | Gruneberg | 73/168 |
| 4,134,293 | 1/1979 | Handtmann et al. | 73/168 |
| 4,423,664 | 1/1984 | Buchi | 73/168 |
| 4,480,464 | 11/1984 | Whisenand et al. | 73/40 |
| 4,566,310 | 1/1986 | Cohen et al. | 73/168 |
| 4,571,992 | 2/1986 | Kuhn | 73/168 |
| 4,571,994 | 2/1986 | Dickey et al. | 73/168 |
| 4,766,765 | 8/1988 | Ezekoye | 73/168 |
| 4,856,327 | 8/1989 | Branam et al. | 73/168 |

Primary Examiner—William A. Cuchlinski, Jr.
Assistant Examiner—Diego F. F. Gutierrez
Attorney, Agent, or Firm—Krass and Young

[57] ABSTRACT

A method and apparatus for testing hydraulic systems of the type including a prefilled hydraulic cylinder member having a bore, conduit means communicating with the bore proximate one end of the bore, and a piston member positioned within the bore. The test methodology comprises closing the system to substantially preclude escape of hydraulic fluid from the cylinder bore through the conduit means, applying a predetermined force to the piston to urge the piston to move in the cylinder bore, measuring the magnitude of the movement of the piston in the cylinder bore in response to the predetermined force, and accepting or rejecting the hydraulic system dependent upon the magnitude of the measured movement.

16 Claims, 2 Drawing Sheets

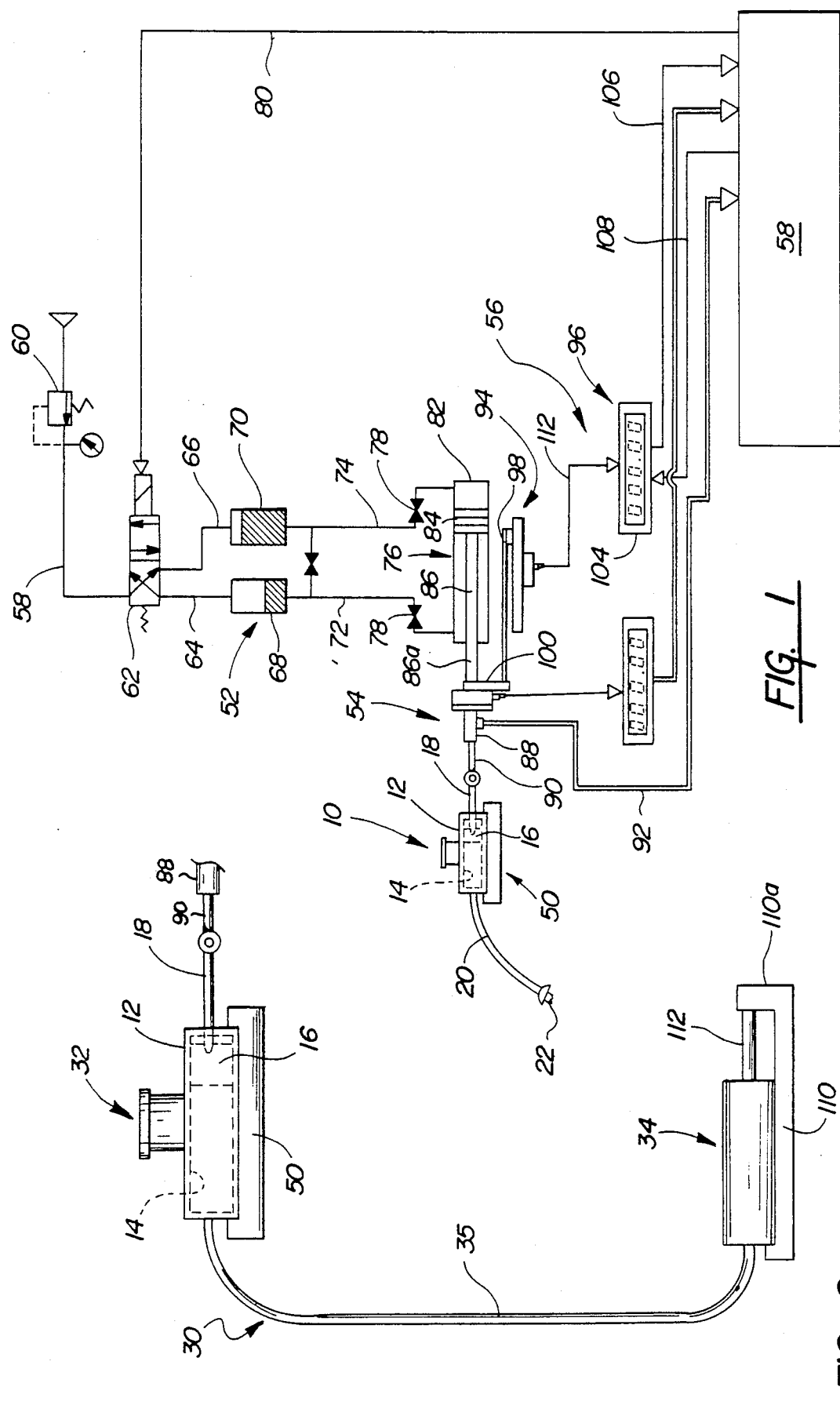

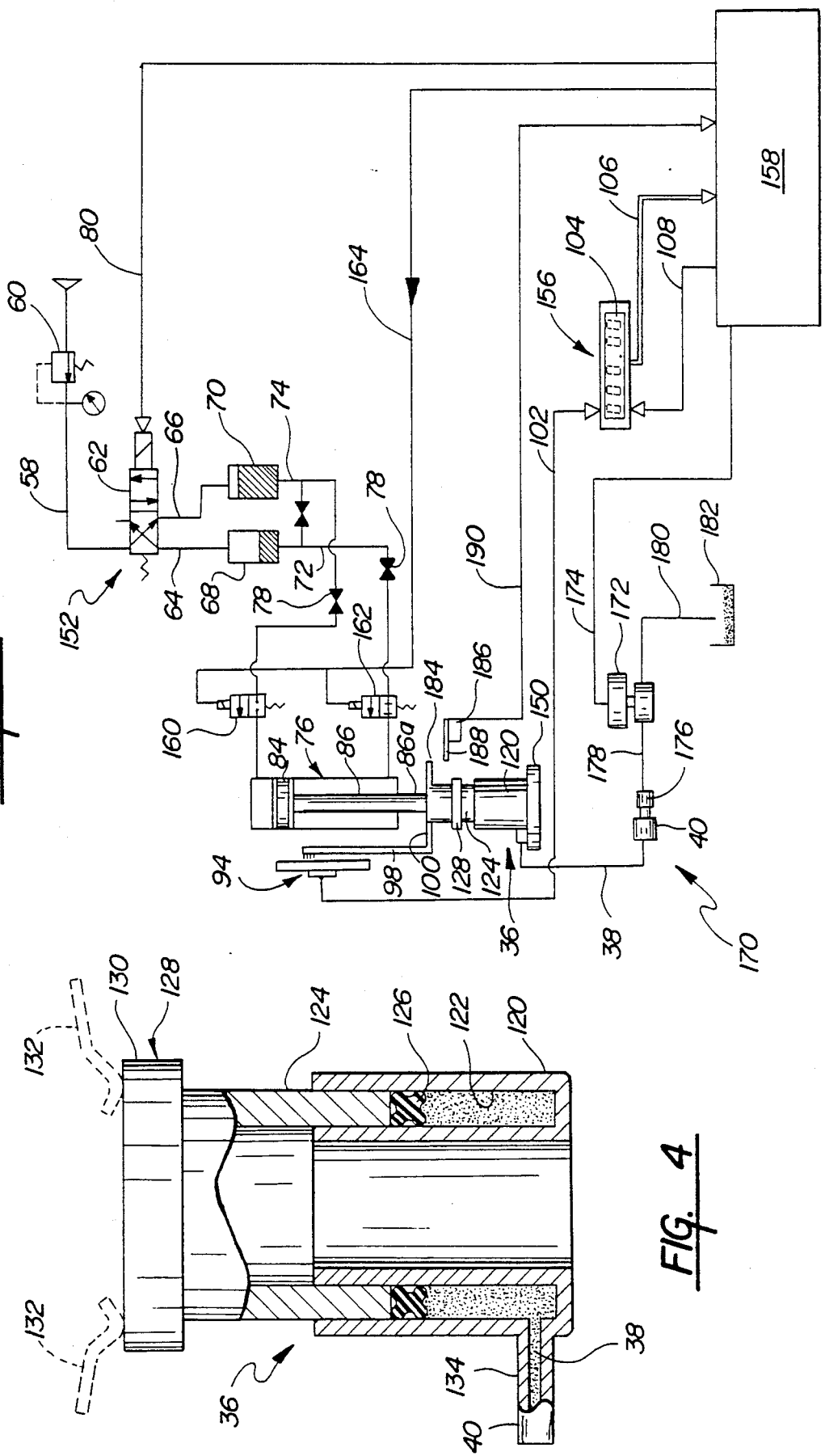

4,993,259

METHOD AND APPARATUS FOR TESTING PREFILLED HYDRAULIC SYSTEMS

BACKGROUND OF THE INVENTION

The present invention relates to hydraulic systems in general and more particularly to a hydraulic control apparatus comprising a hydraulic master cylinder and a hydraulic slave cylinder for operating a mechanism remotely located from the master cylinder; the hydraulic control apparatus being prefilled with hydraulic fluid and pretested prior to shipment to a motor vehicle manufacturer, for example, for installation in a motor vehicle.

It is now known to prefill with hydraulic fluid a motor vehicle clutch control apparatus comprising a master cylinder, a reservoir of hydraulic fluid and a slave cylinder for operating a throw out bearing of a mechanical diaphragm spring clutch. Such prefilled hydraulic control apparatus are shown for example in U.S. Pat. Nos. 4,407,125, 4,599,860, 4,503,678, 4,506,507, 4,607,670, 4,624,290 and 4,624,291, all assigned to the assignee of the present application.

As is well known, prefilling with hydraulic fluid and pretesting hydraulic apparatus for operating vehicle mechanisms such as mechanical clutches presents the many advantages, for the motor vehicle manufacturer, of receiving a fully assembled mechanism comprising all of the components filled with hydraulic fluid and pretested for proper operation ready to install on a motor vehicle on the assembly line without requiring that the components be installed separately, connected by way of a flexible conduit, and filled after installation with hydraulic fluid while being purged of any atmospheric air contained in the apparatus.

It is critical to the successful implementation of such prefilled and pretested hydraulic control apparatus that the pretesting of the prefilled unites be carried out in an efficient, effective and inexpensive manner. Whereas various methods and apparatus have been proposed and utilized in the past to test such prefilled hydraulic apparatus prior to delivery to the ultimate user, the prior art methods and apparatus have embodied relatively time consuming processes and have required the utilization of relatively expensive capital equipment.

SUMMARY OF THE INVENTION

This invention is directed to the provision of an improved method and apparatus for testing prefilled hydraulic systems.

The invention methodology is especially applicable to a prefilled hydraulic system of the type including a prefilled hydraulic cylinder member having a bore and conduit means communicating with the bore proximate one end of the bore and a piston member positioned within the bore. According to the invention methodology, the system is closed to substantially preclude escape of hydraulic fluid from the cylinder member bore through the conduit means; a predetermined force is applied to at least one of the piston and cylinder members in a sense to urge the piston member to move in the cylinder member bore toward the end of the bore proximate the conduit means; the magnitude of relative movement of the piston and cylinder members in response to the application of the predetermined force is measured; and the hydraulic systems are accepted or rejected dependent upon the magnitude of the measured relative movement. This methodology provides a quick and inexpensive means of testing the prefilled hydraulic systems.

According to a further feature of the invention methodology, the cylinder member is held in a fixture and a predetermined force is applied to the piston member so that the relative movement occurs as movement of the piston member in the bore of the cylinder member.

According to a further feature of the invention methodology, the measuring step comprises generating a plurality of pulses proportionate to the relative movement of the piston and cylinder members and delivering the pulses to a counter which generates an output signal corresponding to the magnitude of the relative movement. This methodology provides a convenient and efficient means of generating the required output signal whereby to judge the acceptability of the hydraulic system.

According to a further feature of the invention methodology, the accept/reject step is performed by delivering the output signal to a controller which functions to release the hydraulic system if the system is acceptable and retain the hydraulic system if the system is unacceptable. This methodology provides a convenient means of apprising the operator of the testing equipment of the acceptability or unacceptability of the hydraulic system being tested.

According to a further feature of the invention methodology, the hydraulic system is held in a fixture and the controller functions to allow the release of the hydraulic system from the fixture in the case of an acceptable system and to prevent the release of a hydraulic system from the fixture in the case of an unacceptable system. With this arrangement, the operator is positively apprised of the unacceptability of a particular hydraulic system by the fact that the system cannot be removed from the fixture without a further positive step on the part of the operator to allow such release.

The invention methodology is applicable to hydraulic cylinder assemblies of the type including a cylinder, a piston positioned within the bore of the cylinder, and a piston rod connected at one end to the piston and extended out of the free end of the cylinders, as well as to hydraulic cylinders of the so-called concentric type in which the hydraulic cylinder defines an annular bore and the piston has an annular configuration and is slidably received in the annular bore of the cylinder.

In the case of hydraulic cylinders of the type including a piston rod, the predetermined force is preferably applied to the free end of the piston rod.

In the case of hydraulic cylinders of the concentric type, the predetermined force is preferably applied to the free end of the annular piston, either directly to the piston or, preferably, to an annular release bearing carried on the free end of the annular piston.

In the case of a hydraulic cylinder of the type including a piston rod, the invention methodology comprises the further step of taking up tolerance slack in the system prior to commencing the measuring of the movement of the piston member in the bore of the cylinder member. This slack take-up step may comprise for example generating a signal to commence the measurement of the piston member movement upon the sensing of a predetermined preload force indicative of the take-up of the slack in the system. This arrangement assures that the measured movement of the piston does not reflect a mere take-up of slack in the system.

In the case of an annular cylinder assembly, the invention methodology includes the further step of moving the annular piston into the bore of the cylinder a preliminary amount prior to closing the system and prior to commencing the measurement of the piston member in the bore of the cylinder so as to eject hydraulic fluid from the system through the conduit means. This arrangement allows the overall height of the cylinder, piston, and bearing assembly to be precisely set to a predetermined desired shipping height prior to initiation of the invention methodology of applying a predetermined force to the system to test the integrity of the prefilled system.

The invention apparatus includes a fixture for receiving the hydraulic cylinder assembly; means for closing the conduit means communicating with the bore of the cylinder to preclude escape of fluid from the bore of the cylinder through the conduit means; means for applying a predetermined force to at least one of the piston and cylinder members in a sense to urge the piston member to move in the cylinder member bore toward the end of the bore proximate the conduit means; and measuring means operative to generate an output signal representative of the magnitude of relative movement of the piston and cylinder members in response to the predetermined force.

According to a further feature of the invention apparatus, the applying means comprises power means including an output element movable into a force applying position relative to one of the piston and cylinder members and the apparatus further includes a controller operative to activate the power means in a sense to move the output element into its force applying position and thereafter apply the predetermined force to the one member.

According to a further feature of the invention apparatus, the measuring means comprises means for generating a plurality of pulses proportionate to the relative movement of the piston and cylinder members and a counter receiving the pulses and operative to generate the output signal; the output signal is delivered to the controller; and the controller functions to accept or reject the hydraulic system dependent upon the magnitude of the output signal.

According to a further feature of the invention apparatus, the controller is operative in response to receipt of an output signal corresponding to an acceptable hydraulic system to allow removal of the hydraulic system from the fixture and is operative in response to receipt of an output signal corresponding to an unacceptable hydraulic system to inhibit removal of the hydraulic system from the fixture.

According to a further feature of the invention apparatus, the power means comprises a power cylinder including a cylinder, piston and piston rod; the output element comprises the piston rod of the power cylinder; and the controller is operative to control the delivery of pressurized fluid to the power cylinder at a predetermined fluid pressure calibrated to generate the predetermined force for application to the hydraulic cylinder assembly.

BRIEF DESCRIPTION OF THE DRAWING

FIG. 1 is a schematic view of an apparatus for testing a prefilled hydraulic system;

FIG. 2 is a fragmentary view of an alternative hydraulic system that may be tested utilizing the apparatus of FIG. 1;

FIG. 3 is a schematic view of an alternate test apparatus especially suitable for testing hydraulic cylinder assemblies of the concentric type; and FIG. 4 is a fragmentary view of a hydraulic cylinder assembly of the concentric type

DETAILED DESCRIPTION OF THE PREFERRED EMBODIMENT

The test apparatuses shown in the drawings are intended for utilization in testing prefilled hydraulic systems of various types. For example, the test apparatus of FIG. 1 may be utilized to test a hydraulic system 10 of the type including a cylinder 12 defining a bore 14, a piston 16 positioned within the bore of the cylinder, a piston rod 18 connected at one end to piston 16, a conduit 20 extending from the end of the bore 14 remote from the piston rod 18, and a male quick connect member 22 normally closing the free end of the conduit 20 but functioning in known manner in response to coupling with a female quick connect member to allow fluid flow through the coupled quick connect members.

Further, as seen in FIG. 2, the test apparatus of FIG. 1 may be utilized to test a hydraulic system 30 of the type including a master cylinder 32, a slave cylinder 34, and a conduit 35 interconnecting the output of the master cylinder and the input of the slave cylinder.

The test apparatus of FIG. 3 may be utilized to test a prefilled hydraulic system of the concentric type including a concentric slave cylinder assembly 36, a conduit 38 communicating with the annular bore of the cylinder of the slave cylinder assembly, and a female quick connect member 40 secured to the free end of the conduit 38 and operative in known manner to normally close the end of the conduit but to open in response to engagement with a complimentary male quick connect member to allow flow of fluid through the coupled quick connect members.

With reference to FIG. 1, the test apparatus shown schematically therein includes a fixture 50, a force applying system 52, a tolerance take-up system 54, a measuring system 56, and a controller 58.

The fixture 50 may take many forms and functions to receive the cylinder 12 of the cylinder assembly 10 in a locked, nested disposition within the fixture so as to preclude movement of the cylinder during the test procedure.

The force applying system 52 includes an air conduit 58 connected to plant air, a lab grade regulator 60 regulating the pressure of air in the conduit 58, an air solenoid valve 62 connected to air conduit 58, air conduits 64 and 66 connected to the output of valve 62, air over oil tanks 68 and 70 connected respectively to air conduits 64 and 66, oil conduits 72 and 74 extending respectively from the outputs of air over oil tanks 68 and 70, a hydraulic force cylinder assembly 76, and a speed control valve 78 interposed in each oil line 72, 74.

Air solenoid valve 62 is controlled by a lead 80 extending from controller 58 and is of the four-way type so as to enable the selective delivery of air in both directions and in known manner through conduits 64, 66.

Air over oil tanks 68, 70 function in known manner to deliver pressurized oil to the opposite ends of hydraulic cylinder 76 in response to the delivery of pressurized air to the respective air over oil tank.

Speed control valves 78 function in known manner to control the speed at which the oil flows through the respective oil conduit 72, 74.

Force cylinder assembly 76 includes a cylinder 82, a piston 84 positioned in the bore of the cylinder 82, and a piston rod 86 having a free end 86a extending out of the cylinder 84. Conduits 72, 74 communicate with the bore of cylinder 82 at opposite sides of piston 84 so as to selectively move the piston 84 reciprocally within the bore of the cylinder in known manner.

Tolerance take-up means 54 includes a preload switch 88 carried on the free end of piston rod 86a and including a probe 90. Switch 88 is a precision switch and functions in known manner in response to a predetermined incremental inward movement of probe 90 representative of a predetermined preload force applied to probe 90 to close the switch and generate an output signal for delivery by a lead 92 to controller 58. Switch 88 may for example be of the type available from Veeder-Root Inc. of Hartford, Conn. as Part No. 748300-003 EUO 78.

Measuring means 56 includes a linear optical encoder 94 and a counter 96.

Linear optical encoder 94 may for example be of the type available from Acu-Rite Division of Bausch and Lohm as Part No. 383106-000.

Encoder 94 includes a plurality of linearly spaced windows which are selectively exposed in response to linear movement of a probe 98 connected to an arm 100 secured to piston rod free end 86a. Encoder 94 functions in response to linear movement of probe 98 to generate a plurality of electrical pulses proportionate to the movement of probe 98 and these pulses are delivered by a lead 102 to counter 96.

Counter 96 may for example be of the type available from Red Lion, Inc. of York, Pa. as Part No. GEM-2000. Counter 96 functions to count the electrical pulses from encoder 94 and to display a readout in a window 104 representative of the extent of linear movement of probe 98. In addition to generating a readout in window 104, counter 96 delivers an output signal representative of the linear movement of probe 98 via a lead 106 to controller 58. A further lead 108 extends from controller 58 to counter 96.

Controller 58 may, for example, be of the general type available from Allen-Bradley of Cleveland, Ohio as Part No. 2/16 1772-LX.

In the operation of the test apparatus of FIG. 1 to test the prefilled hydraulic cylinder assembly 10, the cylinder 12 is first placed by the operator in the fixture 50 whereafter the controller 58 is suitably actuated to begin the test cycle. The controller initially signals the air solenoid valve 62 via lead 80 to actuate the valve in a sense to deliver pressurized plant air through line 66 to air over oil tank 70 while evacuating air through line 64 from air over oil tank 68 so as to deliver pressurized oil to force cylinder 82 through conduit 74 and remove pressurized oil from force cylinder 82 through conduit 72. This has the effect of advancing piston rod 86 to the left as viewed in FIG. 1. The initial leftward movement of the piston rod results in the probe 90 of switch 88 pressing against the free end of piston rod 18 to take up the tolerance slack in the hydraulic cylinder assembly 10, such for example as the slack between the inboard end of the piston rod 18 and the piston 16. Switch 88 includes a spring which is designed to yield, for example, at four pounds force so that the switch closes at such time as a force of four pounds is generated in probe 90 and this four pounds of preload force is sufficient to take up any tolerance slack in the hydraulic cylinder. The closing of the switch 88 upon the occurrence of the preload force in the probe 90 is relayed to controller 58 via line 92. Upon receipt of the signal from line 92, controller 58 sends a signal via lead 108 to counter 96 to enable the counter so that the counter begins to count the pulses thereafter received from linear optical encoder 94.

As the piston rod 86 continues to move to the left as viewed in FIG. 1, a predetermined force is applied to the piston rod 18 of assembly 10 with the magnitude of the force determined by the pressure of the pressurized air delivered via line 58 from regulator 60. This predetermined force may for example approximate 30 pounds and is calculated to generate a predetermined amount of movement of the piston rod 18 in an acceptable hydraulic system 10 or to generate an unacceptable amount of movement of piston rod 18 for an unacceptable hydraulic system 10. The distance that the piston rod 18 will be moved in a closed system is a function of several factors including the amount of residual air remaining in the system, movement of the piston seals within the system, and expansion of the body of the cylinder and the associated parts. The amount of acceptable movement of the piston rod 18, following take-up of tolerance slack in the system, can be readily determined for an acceptable unit.

For example, movement of the piston rod for an acceptable unit may range from 2.75 to 3.0 millimeters with movement in excess of 3.0 millimeters indicating a defect in the hydraulic system. Such a defect may include for example a missing seal on the piston, insufficient fill of hydraulic fluid during the filling operation, presence of ingested air because of an improperly performed filling operation, or the presence of entrapped air in the hydraulic fluid filling the system. If these defects are such as will result in a hydraulic system that will perform improperly when installed in association with an associated apparatus such as the clutch of a motor vehicle, it is imperative that such defects be quickly and readily detected to enable the hydraulic system to be rejected.

As the piston rod 18 moves to the left in FIG. 1 following take-up of the slack in the system, the amount of movement of the piston rod 86 of the force cylinder, and thereby the amount of movement of the piston rod 18 of the hydraulic system 10, is measured by linear movement of the probe 98 relative to the optical encoder 94 to generate electrical pulses which are transmitted on lead 102 to counter 106 which displays the cumulative linear movement of piston rod 18 in the window 104 and generates an output signal corresponding to the linear movement of piston rod 18 for transmittal by lead 106 to controller 58. Controller 58 further includes a timer which functions to measure the amount of movement of the piston rod 18, following delivery of the preload signal via lead 92, for a predetermined period of time such for example as two seconds. Upon the elapse of the predetermined time interval, controller 58 observes the output signal from counter 96 as delivered by a lead 106 and determines whether the part is acceptable or unacceptable based on the magnitude of the output signal received via lead 106. If the amount of movement of piston rod 18 represented by the signal on lead 106 is within permissible limits, the control 58 functions to signal air solenoid valve 62 via lead 80 to move the valve 62 to a position to reverse the delivery and discharge of pressurized oil from and to force cylinder 82 so as to withdraw piston rod 86 to the right as viewed in FIG. 1 and move probe 90 away from piston rod 18, whereby to allow the operator to remove the hydraulic system 10 from the fixture 50. Conversely, if the signal received via lead 106 correlates to an unacceptable amount of movement of piston rod 18, controller maintains the piston rod 86 in an advanced position in which it locks the hydraulic system 10 within the fixture 50 and precludes removal of the hydraulic system by the operator from the fixture until the operator performs a further deliberate action to allow the release of the hydraulic system from the fixture. The controller also preferably functions in this situation to actuate some manner of alarm device or alarm light to positively apprise the operator that the hydraulic system being tested is unacceptable.

When the test apparatus of FIG. 1 is used in association with the hydraulic system of the type seen at 30 in FIG. 2, the hydraulic master cylinder 12 is placed in the fixture 50 and the slave cylinder 34 is placed in a further fixture 110 which includes an upstanding arm portion 110a which engages the push rod 112 of the slave cylinder to maintain the push rod at a predetermined shipping length and to prevent damage to the end of the slave cylinder. The test is otherwise carried out in the manner previously described with respect to the testing of a hydraulic system 10.

The test apparatus seen in FIG. 3 is intended for use in testing a prefilled concentric slave cylinder assembly 36 including a conduit 38 and a female quick connect member 40.

As best seen in FIG. 4, the concentric slave cylinder assembly 36 may for example include an annular cylinder 120 defining an annular bore 122, an annular piston 124 slidably received in annular bore 122, an annular seal 126 positioned in annular bore 122, a release bearing assembly 128 carried at the free end of annular piston 124 and including a rotatable race 130 for coaction in known manner with the diaphragm spring fingers 132 of a typical automotive clutch assembly, a spout 134 extending radially and rigidly from the body of cylinder 12 and defining conduit 38, and female quick connect member 40 carried on the free outer end of spout 134.

The test apparatus seen in FIG. 3 is similar in many respects to the test apparatus seen in FIG. 1 and includes a fixture 150, a force multiplying system 152, a measuring system 156, and a controller 158. Fixture 150, as shown schematically, provides a platform to support the concentric slave cylinder assembly 36 so as to preclude downward movement of the slave cylinder assembly during the test procedure.

Force applying system 152 is generally similar to the force applying system 52 of the FIG. 1 embodiment but further includes hydraulic lock valves 160 and 16 respectively positioned in oil lines 72 and 74 and controlled by a lead 164 connected to controller 158.

Measuring means 156 is generally similar to the measuring means 56 of the FIG. 1 embodiment and includes linear optical encode 94, probe 98 affixed to arm 100 carried by the free end 86a of the force cylinder piston rod 86, and counter 96 connected to linear optical encoder 94 by lead 102, including display window 104, and connected to controller 158 by lead 106.

Controller 158 generally corresponds to controller 58 of the FIG. 1 embodiment.

The FIG. 3 embodiment further includes a shipping height setting system 170.

Shipping height setting system 170 includes a ball valve 172 connected to controller 158 via a lead 174, a male quick connect member 176 for coaction with female quick connect member 40, a conduit 178 interconnecting male quick connect member 176 and ball valve 172, a conduit 180 extending between ball valve 172 and an overflow reservoir 182, a finger or flag 184 carried on the free end 86a of piston rod 86, a proximity switch 186 including a flag 188 for coaction with flag 184, and a lead 190 connecting proximity switch 186 to controller 158. Ball valve 172 may, for example, be of the type available from Foreberg Scientific, Inc. of Detroit, Mich. as Part No. 4F-B6L-T-B-V-21AD and proximity switch 186 may, for example, be of the type available from Efector, Inc. of Exton, Pa. as Part No. IGB2005 ABOWSL-LS100K.

In the operation of the test apparatus of FIG. 3, a prefilled concentric slave cylinder assembly 36 to be tested is placed on fixture 150. The slave cylinder assembly 36 is prefilled to a volume or height higher than the desired shipping or installation height and the test procedure carried out by the apparatus of FIG. 3 includes an initial step whereby the slave cylinder assembly is set at its desired shipping height prior to testing the slave cylinder assembly.

Specifically, after the slave cylinder assembly 36 has been positioned on fixture 150, and with male quick connect member 176 plugged into female quick connect 40 so as to establish fluid communication between conduits 38 and 178, controller 158 is suitably activated by the test operator to begin the test cycle. Initially, solenoid valve 162 is actuated in a sense to deliver pressurized oil to force cylinder 76 in a sense to move the piston rod 86 downwardly and ball valve 172 is signaled by lead 174 in a sense to open the ball valve and provide communication between the bore 122 of the slave cylinder 120 and reservoir 182 via interconnected conduits 38, 178 and 180. As the piston rod 86 moves downwardly against bearing 128, the annular piston 124 is moved downwardly within bore 122 to eject fluid through conduit 38 and through interconnected quick connect members 40 and 176, through conduit 178, through ball valve 172 and through conduit 180 to reservoir 182 so that the piston may move downwardly within the concentric bore of the slave cylinder to establish the desired shipping height for the slave cylinder assembly. The desired shipping height is determined by coaction of flag 184 with flag 188 to actuate proximity switch 186 and signal controller 158 via lead 190 that the desired shipping height has been attained, whereupon solenoid valve 162 is moved to a neutral position to stop the extension of piston rod 86 and lock valves 160 and 162 are actuated in a sense to preclude movement of oil into or out of the bore of cylinder 76 so as to lock the piston rod 86 in the position corresponding to the desired shipping height of the slave cylinder assembly. A timer is initiated at this time and times out (for example, in two seconds) to allow the pressure in the slave cylinder assembly 36 to stabilize, whereafter ball valve 172 is deactivated via lead 174 to close the system so as to preclude any further escape of pressure fluid from bore 122 via conduit 38. At this time, the controller 158 functions to zero counter 156, to enable encoder 94, and to actuate solenoid valve 62 via lead 80 in a sense to again deliver pressurized fluid to force cylinder 76 in a sense to move the push rod 86 downwardly to apply a predetermined force to the bearing 128 and thereby to the piston 124 with the magnitude of the predetermined force established by the predetermined air pressure in line 58 as determined by regulator 60.

The piston rod 86 is allowed to move downwardly and apply the predetermined force to the bearing 128 and piston 124 for a predetermined time period (for example, two seconds) during which time counter 156 functions to count the pulses received via lead 102 from encoder 94, as determined by linear movement of the probe 98, so as to generate a reading in window 104 corresponding to the magnitude of the movement of the piston 124 during the measured time period.

As with the system of FIG. 1, the counter 156 further functions to generate an output signal for transmittal via lead 106 to controller 158 corresponding to the magnitude of the movement of piston 124 occurring during the measured time period and the magnitude of this signal is utilized by the controller to determine the acceptability or unacceptability of the slave cylinder 36.

If the signal received via lead 106 corresponds to an acceptable magnitude of movement of the piston 124 with respect to cylinder 120, the controller signals the solenoid valve 162 to actuate the valve in a sense to allow retraction of the piston rod 86 and thereby allow removal of the acceptable slave cylinder assembly 36 from the fixture 150. Conversely, if the signal received by controller 158 via lead 106 indicates excessive movement of the piston 124 within the bore 122, controller 158 functions to activate lock valves 160 and 162 in a sense to block conduits 72 and 74 and preclude movement of hydraulic fluid into or out of cylinder 76 so that slave cylinder 36 is maintained in a locked disposition between the lower end 86a of piston rod 86 and the fixture 150. The failed unit therefore cannot be removed without some manner of positive step carried out by the operator so that the operator is forced to acknowledge the presence of the failed unit. As with the apparatus of FIG. 1, some manner of alarm signal or warning light may also be provided to ensure that the operator becomes aware that the unit under test has failed.

The method and apparatus of the invention will be seen to provide a positive, quick, effective and inexpensive means of testing prefilled hydraulic systems.

Whereas preferred embodiments of the invention have been illustrated and described in detail, it will be apparent that various changes may be made and disclosed embodiments without departing from the scope or spirit of the invention.

I claim:

1. A method of testing a prefilled hydraulic system of the type including a prefilled hydraulic cylinder member having a bore and conduit means communicating with the bore proximate one end of the bore, and a piston member positioned within the bore, said method comprising the steps of:
   (A) closing the system to substantially preclude escape of hydraulic fluid from said cylinder bore through said conduit means;
   (B) applying a predetermined force to at least one of said members in a sense to urge said piston member to move in said cylinder member bore toward said one end of said bore;
   (C) measuring the magnitude of relative movement of said piston and cylinder members in response to said predetermined force; and
   (D) accepting or rejecting the hydraulic system dependent upon the magnitude of the measured relative movement.

2. A method according to claim 1 wherein:
   (E) said cylinder is held in a fixture; and
   (F) said predetermined force is applied to said piston member so that such relative movement occurs as movement of said piston member in said bore.

3. A method according to claim 2 wherein said system further includes a piston rod connected at one end thereof to said piston member and having a free other end; and
   (G) said predetermined force is applied to said free other end of said piston rod.

4. A method according to claim 2 wherein said cylinder member defines an annular bore and said piston member is annular and projects at one end thereof out of said annular bore; and
   (H) said predetermined force is applied to said one end of said annular piston member.

5. A method according to claim 4 wherein said system further includes an annular bearing assembly carried on said one end of said annular piston member; and
   (I) said predetermined force is applied to said bearing assembly and thereby to said one end of said annular piston member.

6. A method according to claim 5 wherein said method includes the further step of:
   (J) moving said annular piston into said bore a preliminary amount prior to closing the system and prior to commencing the measurement of the movement of the piston member in the bore so as to eject hydraulic fluid from the system through said conduit means and set the overall height of the cylinder member, piston member and bearing assembly.

7. A method according to claim 6 wherein:
   (K) said preliminary movement step comprises generating a signal to commence the measurement of the piston member movement upon the arrival of said bearing member at a position corresponding to the desired overall height of the cylinder member, piston member and bearing assembly.

8. A method according to claim 1 wherein said method comprises the further step of:
   (E) prior to undertaking said force applying and measuring steps, allowing said system to undergo a preliminary amount of relative movement.

9. A method according to claim 8 wherein said preliminary movement step comprises:
   (F) taking up tolerance slack in the system.

10. A method according to claim 9 wherein:
    (G) said slack take-up step comprises generating a signal to commence the measurement of the relative movement upon the sensing of a predetermined preload force indicative of the take-up of slack in the system.

11. A method according to claim 10 wherein:
    (H) said signal is generated by a preload switch which is activated in response to said predetermined preload force.

12. A method according to claim 8 wherein said preliminary movement step comprises:
    (F) prior to closing said system, allowing a predetermined amount of relative movement of the system to set the system at a predetermined overall height.

13. A method according to claim 1 wherein:
    (E) said measuring step comprises generating a plurality of pulses proportional to the relative movement of the piston and cylinder members and delivering the pulses to a counter which generates an output signal corresponding to the magnitude of the relative movement.

14. A method according to claim 13 wherein:

(F) said accept/reject step is performed by delivering said output signal to a controller which functions to release the hydraulic system if the system is acceptable and retain the hydraulic system if the system is unacceptable.

15. A method according to claim 14 wherein:
(G) said system is held in a fixture and said controller functions to allow the release of the hydraulic system from the fixture in the case of an acceptable system and to prevent the release of the hydraulic system from the fixture in the case of an unacceptable system.

16. A method according to claim 1 wherein:
(E) said predetermined force is applied for a predetermined period of time.

* * * * *